Aug. 14, 1945. C. B. MOORE 2,382,941
VALVE POSITIONER
Filed Sept. 4, 1941 2 Sheets-Sheet 1
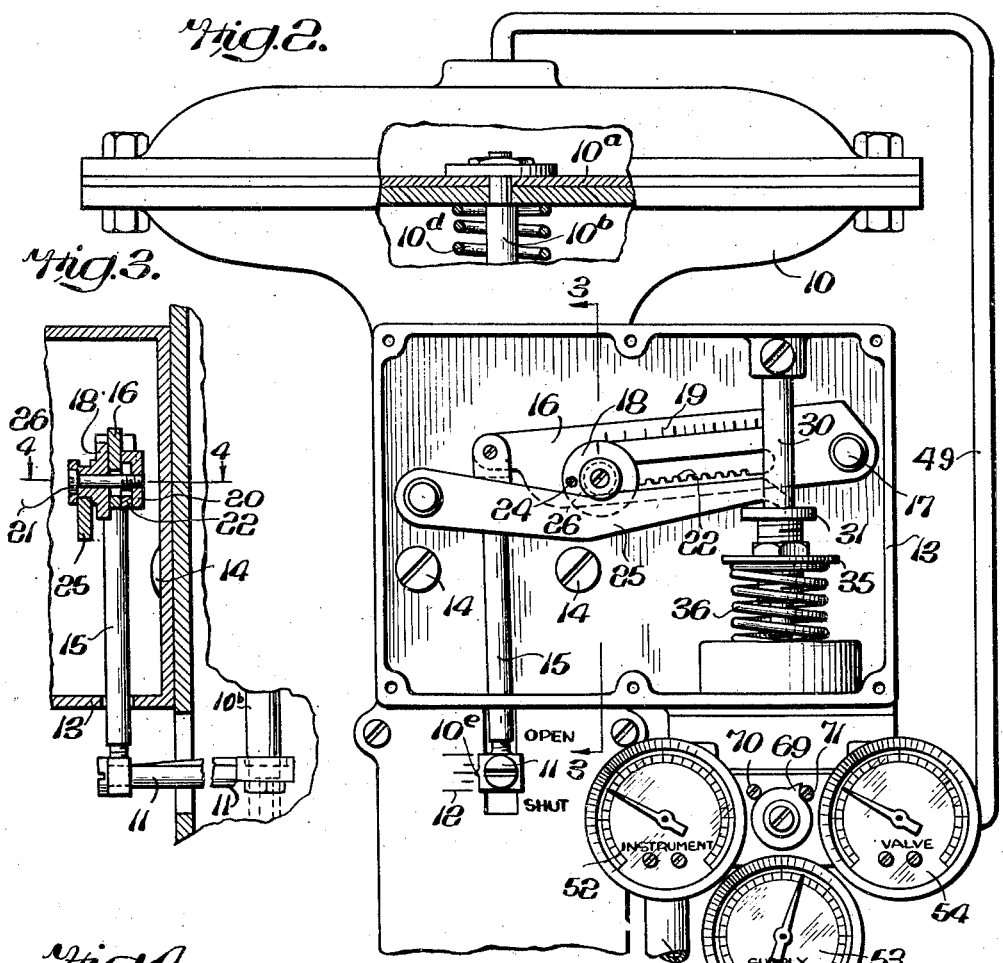
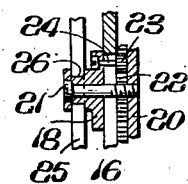
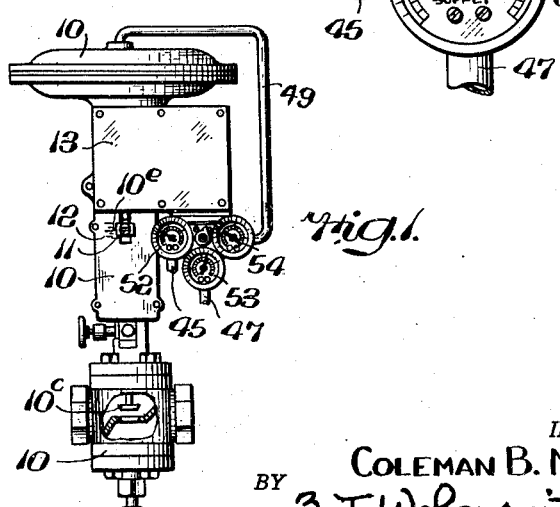
INVENTOR
COLEMAN B. MOORE
BY J. T. Wolbensmith
ATTORNEY

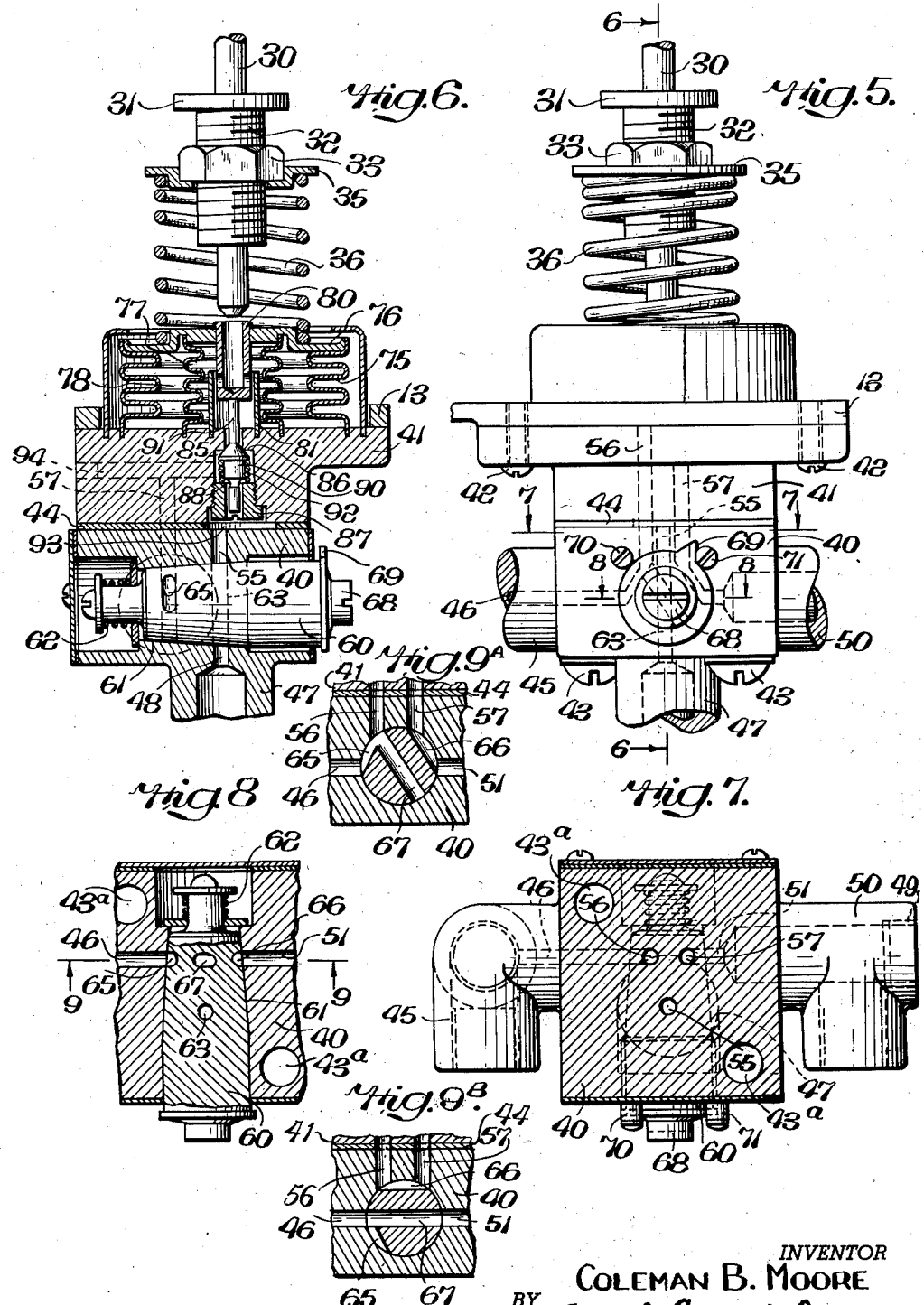

Patented Aug. 14, 1945

2,382,941

UNITED STATES PATENT OFFICE 2,382,941

VALVE POSITIONER

Coleman B. Moore, Carroll Park, Pa., assignor to Moore Products Co., Philadelphia, Pa., a co-partnership Application September 4, 1941, Serial No. 409,472

4 Claims. (Cl. 121—41)

This invention relates to valve positioners and more particularly to apparatus for providing for accurate positioning of a fluid operated or fluid controlled valve.

It is a principal object of the present invention to provide a valve positioner which will be sensitive though rugged and reliable and rapid in its operation.

It is a further object of the present invention to provide a valve positioner which will be free from hysteresis.

It is a further object of the present invention to provide a valve positioned with linear characteristics for effecting straight line valve positioning.

It is a further object of the present invention to provide a valve positioner in which a rebalancing operation is effected with spring loading, to reduce the required movement to a minimum while retaining sensitivity.

Other objects of the invention will be apparent from the annexed specification and claims.

The nature and characteristic features of the invention will be more readily understood from the following description, taken in connection with the accompanying drawings forming part hereof, in which:

Figure 1 is a front elevational view showing the valve positioner of the present invention in place on a valve, parts of the valve being shown in section to show the interior construction;

Fig. 2 is a front elevational view, on a somewhat larger scale than Fig. 1, of a preferred embodiment of the valve positioner of the present invention, the front cover plate being removed to show the interior construction thereof, and parts of the valve being shown in section to illustrate the construction;

Fig. 3 is a fragmentary vertical sectional view taken approximately on the line 3—3 of Fig. 2, and showing certain details of construction;

Fig. 4 is a fragmentary horizontal sectional view taken approximately on the line 4—4 of Fig. 3;

Fig. 5 is a fragmentary elevational view of a portion of the valve positioner of the present invention;

Fig. 6 is a vertical sectional view taken approximately on the line 6—6 of Fig. 5;

Fig. 7 is a horizontal sectional view taken approximately on the line 7—7 of Fig. 5;

Fig. 8 is a fragmentary sectional view taken approximately on the line 8—8 of Fig. 5; and Figs. 9A and 9B are vertical sectional views taken approximately on the line 9—9 of Fig. 8, and showing different positions of the by-pass valve.

It will, of course, be understood that the description and drawings herein are illustrative merely, and that various modifications and changes may be made in the structure disclosed without departing from the spirit of the invention.

Referring more particularly to the drawings in which a preferred embodiment of the invention is illustrated a fluid pressure actuated or controlled valve is shown generally at 10 and may be of any of the well known types of such valves available on the market such, for example, as the type which includes a diaphragm $10^a$ connected to a valve stem $10^b$ for operating the disc $10^c$ of the valve to a selected position in accordance with the pressure applied against the diaphragm $10^a$, and against the pressure of a valve spring $10^d$. The valve stem $10^b$ is provided with an indicator $10^e$ with an extension finger 11, which is rigidly mounted or otherwise mounted for movement with the valve stem in the customary manner, for external observation in conjunction with an index 12 of the location of the valve disc $10^c$.

For purposes of illustration, the fluid pressure actuated or controlled valve 10 shown is of the type which is adapted to be closed or actuated toward a closed position upon an increase in instrument or control pressure, or to be opened or actuated toward an open position upon a decrease of the instrument or control pressure. It will, of course, be understood that such a valve operable by opposite conditions of instrument or control pressure could be employed if desired. A casing 13 is provided for attachment to the valve 10 in any preferred manner such, for example, as by means of screws 14 extending from the casing 13 into a portion of the valve body.

Within the casing 13, the mechanism is provided for translating the position of the valve to a pneumatic unit, of a character hereinafter more fully referred to. The translating mechanism preferably includes a rod 15 secured at its lower end to the indicator finger 11 for movement with the valve stem. The rod 15 is pivotally connected at its upper end to a lever member 16, the lever member 16 being carried on a pivot 17 within the casing 13.

The lever member 16 preferably has an adjustable fulcrum element 18 thereon for accommodating and adjusting the valve positioner in accordance with the distance of valve disc travel of the valve with which it is used. The fulcrum element 18 includes an index plate movable along the front of the lever 16 for positioning the fulcrum element 18 with respect to a valve travel index 19 on the lever 16, and a clamping plate 20 mounted on the back of the lever 16. The plates 18 and 20 are connected by a clamping screw 21. The lever 16 also has secured thereto a rack 22, and a small pinion 23 is carried on a shaft 24. The shaft 24 is adapted to be turned by a screw driver, upon loosening of the screw 21, and the pinion 23, in engagement with the rack 22, provides for adjustment. The fulcrum member 18 may thus be moved along the lever member 16 for adjustment and clamped in the desired position for a particular valve travel distance. A lever 25 is provided and is pivotally mounted within the casing 13, the fulcrum member 18 having a grooved portion 26 bearing against the lever 25 for actuating the same.

A guide rod 30 is mounted within the casing 13 and has slidably mounted thereon a head 31 with which the lever 25 is adapted to engage. The head 31 includes a downwardly extending threaded portion 32 on which a nut 33 is provided, the nut bearing on a spring end plate 35 and the plate 35 being in engagement with the upper end of a compression spring 36. The spring 36 is preferably selected so as to have linear characteristics upon the compression and expansion thereof. By suitable positioning of the nut 33 on the threaded portion 32, the desired initial loading in accordance with the instrument or control pressure may be imparted to the spring 36, and therefrom to the pneumatic unit, as hereinafter more fully pointed out.

The pneumatic unit, as shown particularly in Figs. 5, 6, and 7, preferably includes a by-pass portion within a by-pass body portion 40 and a control portion carried by a control body portion 41. The by-pass portion is adapted to be permanently connected into the system and permits of separation and removal of the control portion. The control body portion 41 is preferably secured to the casing 13 by means of screws 42 which extend through suitable openings in the control body portion 41. The by-pass body portion 40 is preferably secured to the control body portion 41 by screws 43, extending through holes 43ᵃ, a gasket 44 being mounted between the by-pass body portion 40 and the control body portion 41. The control portion may thus be removed, if desired, for cleaning or for adjustment, without disconnecting the by-pass body portion 40 from the system.

The by-pass body portion 40 has an instrument or control pressure connection 45 with a passageway 46 in communication therewith, through which pressure fluid, variable in pressure in accordance with the valve positioning desired, is delivered. The by-pass body portion 40 also has an air supply connection 47 with a passageway 48 in communication therewith, through which air under pressure, preferably from a suitable source of pressure regulated and filtered air, is supplied. The by-pass body portion 40 also has a valve connection 50 with a passageway 51 in communication therewith for delivery of pressure fluid from the valve positioner by a suitable pipe 49 to the diaphragm chamber of the fluid pressure operated or controlled valve 10. The instrument connection 45, air supply connection 47, and valve connection 50 may be respectively provided with visual pressure gages 52, 53, and 54 for observation of the pressures prevailing in the passageways 46, 48, and 51, respectively.

The by-pass valve body 40 has a passageway therein adapted for communication with a passageway 48, as hereinafter more fully pointed out. To the rear of the passageway 48 additional passageways 56 and 57 are provided for communication, respectively, with the passageway 46 of the instrument connection 45, and with the passageway 51 of the valve connection 50.

A rotatable by-pass valve plug 60 is provided within the by-pass valve body 40 and has a tapered plug portion 61, a spring 62 being provided at the rear thereof for holding the plug 60 in its proper seated position. A conduit 63 is provided within the plug 60 for effecting communication between the passageway 48 of the supply connection 47 and the passageway 55. A slot 65 is provided in the face of the plug portion 61 for placing the passageway 46 in communication with the passageway 56 and a slot 66 is provided for placing the passageways 57 and 51 in communication, as illustrated more particularly in Fig. 9A. A by-pass passageway 67 is also provided in the plug 60 for directly connecting the passageway 46 of the instrument connection 45 with the passageway 51 of the valve connection 50 when it is desired to by-pass the control portion of the pneumatic unit, as illustrated more particularly in Fig. 9B.

The valve plug 60 has a slot 68 at the front end thereof for movement of the valve plug 60 to the desired position, an indicating pointer 69 movable between stop pins 70 and 71 being provided for indicating the positioning of the plug 60.

On the upper face of the control body portion 41, a metallic bellows 75 is provided, the lower end of the bellows 75 being mounted in the body 41 in fluid tight relationship. The upper end of the bellows 75 is closed by a bellows closure plate 76 with which the bellows 75 is in fluid tight relationship. The compression spring 36 is in continuous engagement with the bellows closure plate 76. Within the bellows 75, a smaller metallic bellows 77 is provided, the effective area of the respective bellows 75 and 77 preferably being selected in accordance with the requirements of the fluid pressures available and utilized with the valve positioner. The metallic bellows 77 is mounted at its lower end in the control body portion 41 in fluid tight relationship and is connected at its upper end to the bellows closure plate 76 in fluid tight relationship. An expansible fluid pressure chamber 78 is thus provided in the space between the bellows 75 and the bellows 77, and the passageway 56 is in communication therewith for supplying fluid at the pressure prevailing at the instrument connection 45.

As the center of the bellows closure plate 76, an exhaust sleeve 80 is provided, the sleeve 80 having a central opening and side passages so that the space within the interior of the bellows 77 is in continuous communication with the atmosphere. A limit sleeve 81 is provided within the bellows 77 for limiting the downward movement of the bellows closure plate 76. The lower end of the guide rod 30 serves as a stop for limiting the upward movement of the bellows closure plate 76. The stops thus provided prevent injury to the bellows during initial testing and during operation.

A pilot valve chamber 85 is provided in the control body portion 41 and has a seat 86 at the upper end thereof. A threaded plug 87, removably mounted in the control body portion 41, is provided, the plug 87 having a lower seat 88 at the upper end thereof.

A pilot valve 90, located in the pilot valve chamber 85, has a valve stem 91 for engagement by the bottom face of the sleeve 80. The pilot valve 90 has an upper tapered seat engaging portion for movement towards and into engagement with the upper seat 86 for controlling the discharge of fluid from the pilot valve chamber 85. The pilot valve 90 also has a lower tapered seat engaging portion for movement towards and into engagement with the lower seat 88 for controlling the admission of fluid to the pilot valve chamber 85. The upper seat 86 and the lower seat 88, and the corresponding tapered seat engaging portions of the pilot valve 90, are preferably so located that the pilot valve 90 may occupy a position in engagement with the upper seat 86, whereby the discharge from the pilot valve chamber 85 is cut off and the maximum fluid pressure available from the supply connection is admitted to the pilot valve chamber 85, may occupy a position in engagement with the lower seat 88, whereby the introduction of fluid under pressure to the pilot valve chamber 85 is cut off and the fluid is discharged from the pilot valve chamber 85, or intermediate positions out of engagement with the upper seat 86 and the lower seat 88, whereby the equilibrium pressure within the pilot valve chamber 85 is determined by the differential between the pressure of the fluid admitted and the pressure at which fluid is discharged from the pilot valve chamber 85. A spring 92, bearing on the pilot valve 85 and on the plug 87, is provided for urging the pilot valve 90 into engagement with the lower end of the sleeve 80 and toward the upper seat 86. The spring 92 is effective in the same direction as the pressure of the supply air.

The passageway 55 which is adapted to be in communication with the passageway 48, of the air supply connection 47, is in communication with a space 93 below the lower side of the plug 87. The pilot valve chamber 85 is connected by a passageway 94, in the control body portion 41, to the passageway 57 and thus is in communication with the passageway 51, of the valve connection 50.

The mode of operation of the valve positioner of the present invention may now be pointed out.

If a direct connection from the instrument to the valve 10 is desired for direct delivery of the instrument or control pressure to the valve 10, the valve plug is turned counter-clockwise to its limit position and thus to the by-pass position indicated in Fig. 9B. In this position, the conduit 63 in the valve plug 60 is also moved to a position so as to cut off communication from the air supply connection to the passageway 55. The passageway 46, which is connected to the instrument connection 45, is in communication with the passageway 51, which is connected to the valve connection 50, through the conduit 67 in the valve plug 60 and the pressure at the instrument connection 45 is directly available at the valve 10.

When it is desired to use the valve positioner, the valve plug 60 is moved in a clockwise direction to its other limit position and thus places the cutout portion 65 in a position to provide for communication between the passageway 46 connected to the instrument connection 45 and the passageway 56 connected to the chamber 78 between the bellows 75 and the bellows 77. At the same time, the cutout 66 provides for communication between the passageway 57 and the passageway 51 connected to the valve connection 50 so that fluid is supplied from the pilot valve chamber 85 to the valve connection 50 as hereinafter pointed out. The passageway 48 of the air supply connection 47 is then in communication with the passageway 55 through the conduit 63 in the valve plug 60 for supplying air at the supply pressure to the space 93 below the plug 87.

The fluid supplied through the instrument connection 45 and through the passageway 46, the cutout 65 and the passageway 56 to the chamber 78 between the bellows 75 and the bellows 77 will provide a force tending to move the bellows closure plate 76 upwardly against the force exerted by the compression spring 36. The bellows closure plate 76 through the sleeve 80 will position the pilot valve 90 in accordance with the position of the bellows closure plate 76. Air from the air supply connection 47 will pass through the passageway 48, the conduit 63, and the passageway 55, and will pass into the pilot valve chamber 85 past the seat 88. The pressure of the air introduced into the pilot valve chamber 85 will be determined by the position of the pilot valve 90 with respect to the lower seat 88. The position of the upper seating portion of the pilot valve 90 with respect to the upper pilot valve seat 86 will determine the rate of discharge of fluid from the pilot valve chamber 85 and an equilibrium pressure will be quickly reached for any particular position of the pilot valve 90 in the pilot valve chamber 85.

The pressure which prevails in the pilot valve chamber 85 will be effective through the passageway 94, the passageway 57, the cutout portion 66, the passageway 51 of the valve connection 50, and the pipe 49 for providing a predetermined pressure upon the diaphragm $10^a$ of the fluid operated or fluid controlled valve 10. This pressure tends to move the valve 10 to the desired position.

If, however, the fluid pressure operated or fluid controlled valve 10 does not thus assume a position determined by the effect of the pressure at the instrument connection 45, the valve positioner is effective to insure the proper positioning of the fluid operated or fluid controlled valve 10. The actual position of the fluid pressure operated or fluid pressure controlled valve 10, as distinguished from the desired position of that valve for a particular instrument pressure, determines the positioning of the indicator finger 11. The actual position of the indicator finger 11 causes the rod 15 connected thereto to be positioned in accordance with the actual position, and this position from the rod 15 through the lever 16, the fulcrum element 18 and the lever 25 determines the position of the end of the lever 25 and thereby of the head 31 and the spring end plate 35. This position tends to impart a force, determined by the difference between the actual and the desired position of the valve 10, on the compression spring 36 which is in turn effective on the closure plate 76 for controlling the pilot valve 90.

If the instrument pressure increases, thus calling for a closing of the fluid pressure operated or fluid controlled valve 10, the increase tends to move the bellows closure plate 76 upwardly, and this would normally cause an increased pressure to be effective at the valve connection 50, by reason of the positioning of the pilot valve 90. The upward movement of the pilot valve 90 would tend to increase the pressure of the fluid in the pilot valve chamber 85 by admitting fluid at higher pressure past the lower valve seat 88, and at the same time reduce the discharge past the upper valve seat 86. If the fluid pressure operated or controlled valve 10 does not respond by moving downwardly to the desired position to reduce the flow therethrough, the rod 15 will not move downwardly and this will result in an increased force being effective from the spring 36 onto the bellows closure plate 76. This in turn will affect the operation of the pilot valve 90 so that the pressure in the pilot valve chamber 85 and in the pipe 49 will not be decreased and a greater force will be effective on the diaphragm 10ª of the fluid pressure operated or fluid controlled valve 10. This force tends to increase to an extent to overcome the obstacles, such as friction and the like, which prevented the response of the fluid pressure operated or fluid controlled valve 10 to the increase in instrument or control pressure.

If the instrument pressure should decrease, thus calling for opening of the fluid pressure operated or fluid controlled valve 10, this decrease tends to permit the bellows closure plate 76 to move downwardly. This would normally cause a decreased pressure to be effective at the valve connection 50, by reason of the positioning of the pilot valve 90. The downward movement of the pilot valve 90 would tend to decrease the pressure of the fluid in the pilot valve chamber 85. This movement would cause a decreased pressure by reducing the pressure of the fluid admitted to the pilot valve chamber 85, past the valve seat 88, and at the same time decreasing the discharge past the upper valve seat 86. If the fluid pressure operated or fluid controlled valve 10 does not respond by moving upwardly to a position to reduce the flow therethrough, the rod 15 will not move upwardly and this will result in a decreased force being effective from the spring 36 onto the bellows closure plate 76. This in turn will affect the operation of the pilot valve 90 so that the pressure in the pilot valve chamber 85 and in the pipe 49 will be decreased and a decreased force will be effective on the diaphragm 10ª of the fluid pressure operated or fluid controlled valve 10. This decreased force will likewise be effective for causing operation to overcome the obstacles which prevented the response of the fluid pressure operated or fluid controlled valve 10 to the decrease in instrument pressure.

While the operation of the positioner has been pointed out in connection with a fluid pressure operated or a fluid controlled valve 10 which is closed by an increase of instrument or control pressure, it will be obvious that the positioner could be utilized without change with a valve which responded in the opposite direction for opening the valve upon an increase in the instrument or control pressure.

The rebalancing of the bellows closure plate 76 by the motion of the valve stem 10ᵇ, acting through the translating mechanism, including the spring 36, permits of attaining equilibrium conditions in accordance with changes of instrument pressure with a very small total range of movement of the bellows closure plate 76. The requisite sensitivity is thus obtained by the use of bellows which are capable of extension far beyond the total range of actual movement of the bellows closure plate 76. As the bellows closure plate 76 is responsive to very small changes in instrument pressure and the bellows closure plate 76 is rebalanced by the movement of the valve stem 10ᵇ substantially at its initial position, any non-linear effect of the bellows 75 and 77 is rendered negligible. The desired linear characteristics of operation of the valve positioner are thus obtained.

The valve positioner, as heretofore indicated, insures the operation of the fluid pressure operated or fluid controlled valve with which it is used to the true position required by the instrument or control pressure. The direct connection between the pressure responsive elements, including the bellows closure plate 76 and the pilot valve 90, obviates errors in positioning of the valve 10. The direct control of the fluid delivered to the valve connection 50, without the interposition of any structure between the bellows closure plate 76 and the pilot valve 90 which would in any way prevent accurate positioning of the pilot valve 90 in response to the desired and prevailing conditions, is particularly effective in providing for accurate positioning of the valve 10.

I claim:

1. In positive positioning apparatus for a pressure actuated member, a body portion having an expansible chamber with a movable wall portion responsive to a control fluid pressure in said chamber, means including a resilient compression member acting on said movable portion for applying a restoring force on said movable portion determined by the position of said pressure actuated member, pressure transmitting means actuated by the positioning of said movable portion, said transmitting means including a pilot valve chamber in said body portion having spaced fluid supply and exhaust ports facing each other and coaxial with said expansible chamber, means for supplying pressure fluid to said pilot valve chamber through said supply port, a floating pilot valve within said pilot valve chamber movable between said ports and having a pair of port engaging portions for controlling the fluid supply and exhaust through said ports, a compression spring in said pilot valve chamber in engagement with said pilot valve on the fluid supply port side thereof, an actuating member for said pilot valve coaxial with said expansible chamber extending through said exhaust port and held in engagement with said movable portion for movement in the same direction therewith, and pressure transmitting connections from said pilot valve chamber to said pressure actuated member.

2. In positive positioning apparatus for a pressure actuated member, a body portion having an expansible chamber with a movable closure wall portion responsive to a control fluid pressure in said chamber, means including a resilient compression member in engagement with said movable portion for applying a restoring force on said movable portion determined by the position of said pressure actuated member, pressure transmitting means actuated by the positioning of said movable portion, said transmitting means including a pilot valve chamber in said body portion having spaced fluid supply and exhaust ports facing each other and coaxial with said expansible chamber, means for supplying pressure fluid to said pilot valve chamber through said supply port, a floating pilot valve within said pilot valve chamber movable between said ports and having a pair of port engaging portions for controlling the pressure conditions in said pilot valve chamber, a spring in said pilot valve chamber in engagement with said pilot valve and effective in the same direction as the pressure of the supply fluid an actuating member for said pilot valve coaxial with said expansible chamber extending through said exhaust port and held in engagement with said movable portion for movement in the same direction therewith, and pressure transmitting connections from said pilot valve chamber to said pressure actuated member.

3. In positive positioning apparatus for a pressure actuated member, a body portion having inner and outer concentric bellows mounted thereon and spaced to provide a chamber, a movable end closure wall member for said chamber responsive to a control fluid pressure in said chamber, means including a resilient compression member in engagement with said movable member for applying a restoring force on said movable member determined by the position of said pressure actuated member, pressure transmitting means actuated by the positioning of said movable member, said transmitting means including a pilot valve chamber in said body portion having spaced fluid supply and exhaust ports facing each other and coaxial with said bellows, means for supplying pressure fluid to said pilot valve chamber through said supply port, a floating pilot valve within said pilot valve chamber movable between said ports and having a pair of port engaging portions for controlling the fluid supply and exhaust through said ports, a spring in said pilot valve chamber in engagement with said pilot valve and effective in the same direction as the pressure of the supply fluid, an actuating member for said pilot valve coaxial with said bellows extending through said exhaust port and held in engagement with said movable member for movement in the same direction therewith, and pressure transmitting connections from said pilot valve chamber to said pressure actuated member.

4. In positive positioning apparatus for a pressure actuated member, a body portion having inner and outer concentric bellows mounted thereon and spaced to provide a chamber, a movable end closure wall member for said chamber responsive to a control fluid pressure in said chamber, means for applying a restoring force on said closure wall member determined by the position of said pressure actuated member, pressure transmitting means actuated by the positioning of said closure wall, said transmitting means including a pilot valve chamber in said body portion having spaced fluid supply and exhaust ports facing each other and coaxial with said bellows, means for supplying pressure fluid to said pilot valve chamber through said supply port, said exhaust port discharging through the space within the inner of said bellows, a pilot valve within said pilot valve chamber movable between said ports and having a pair of port engaging portions for controlling the fluid supply and exhaust through said ports, an actuating member for said pilot valve extending through said exhaust port and held in engagement with said closure wall for movement in the same direction therewith, said actuating member being coaxial with said bellows, and pressure transmitting connections from said pilot valve chamber to said pressure actuated member.

COLEMAN B. MOORE.